United States Patent [19]

Yee

[11] Patent Number: 5,412,964
[45] Date of Patent: May 9, 1995

[54] ANTI-THEFT DEVICE FOR A MOTOR VEHICLE

[76] Inventor: Shoony A. Yee, 88-17 Corona Ave., Elmhurst, N.Y. 11373

[21] Appl. No.: 218,244

[22] Filed: Mar. 28, 1994

[51] Int. Cl.⁶ .............................................. A47C 31/00
[52] U.S. Cl. ........................................ 70/261; 70/237; 297/378.14
[58] Field of Search .................... 70/261, 238, 237; 297/354, 378, 379, 354.1, 378.1, 378.14

[56] References Cited

U.S. PATENT DOCUMENTS

| | | | |
|---|---|---|---|
| 3,465,556 | 9/1969 | McIlvenny | 70/423 |
| 3,650,347 | 3/1972 | Campos | 70/261 X |
| 4,116,297 | 9/1978 | Ross et al. | 70/261 X |
| 5,213,388 | 5/1993 | Baker | 70/261 X |

FOREIGN PATENT DOCUMENTS

| | | | |
|---|---|---|---|
| 2539603 | 7/1984 | France | 70/261 |
| 2908611 | 10/1980 | Germany | 70/261 |
| 3042033 | 6/1982 | Germany | 70/261 |
| 4066350 | 3/1992 | Japan | 70/261 |
| 2102363 | 2/1983 | United Kingdom | 70/261 |

*Primary Examiner*—Alexander Grosz
*Assistant Examiner*—Suzanne L. Dino
*Attorney, Agent, or Firm*—Michael I. Kroll

[57] ABSTRACT

An anti-theft device is provided for a motor vehicle having a steering wheel, which consists of a driver bucket seat assembly mounted on a floor behind the steering wheel in the motor vehicle. A mechanism is for locking the driver bucket seat assembly in a forward tilted position towards the steering wheel. A thief will not be able to sit in the driver bucket seat assembly and drive the motor vehicle away to steal it.

4 Claims, 2 Drawing Sheets

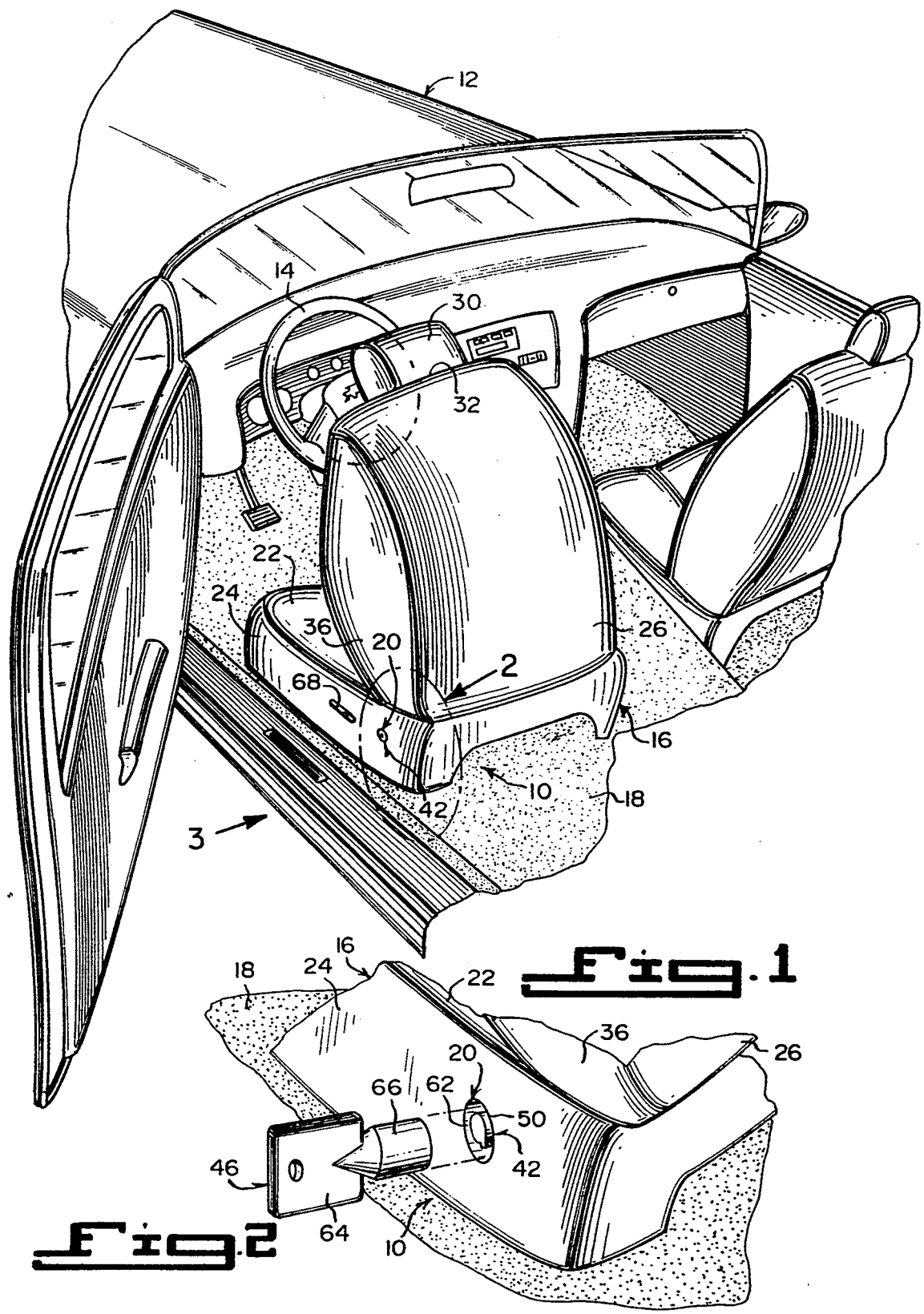

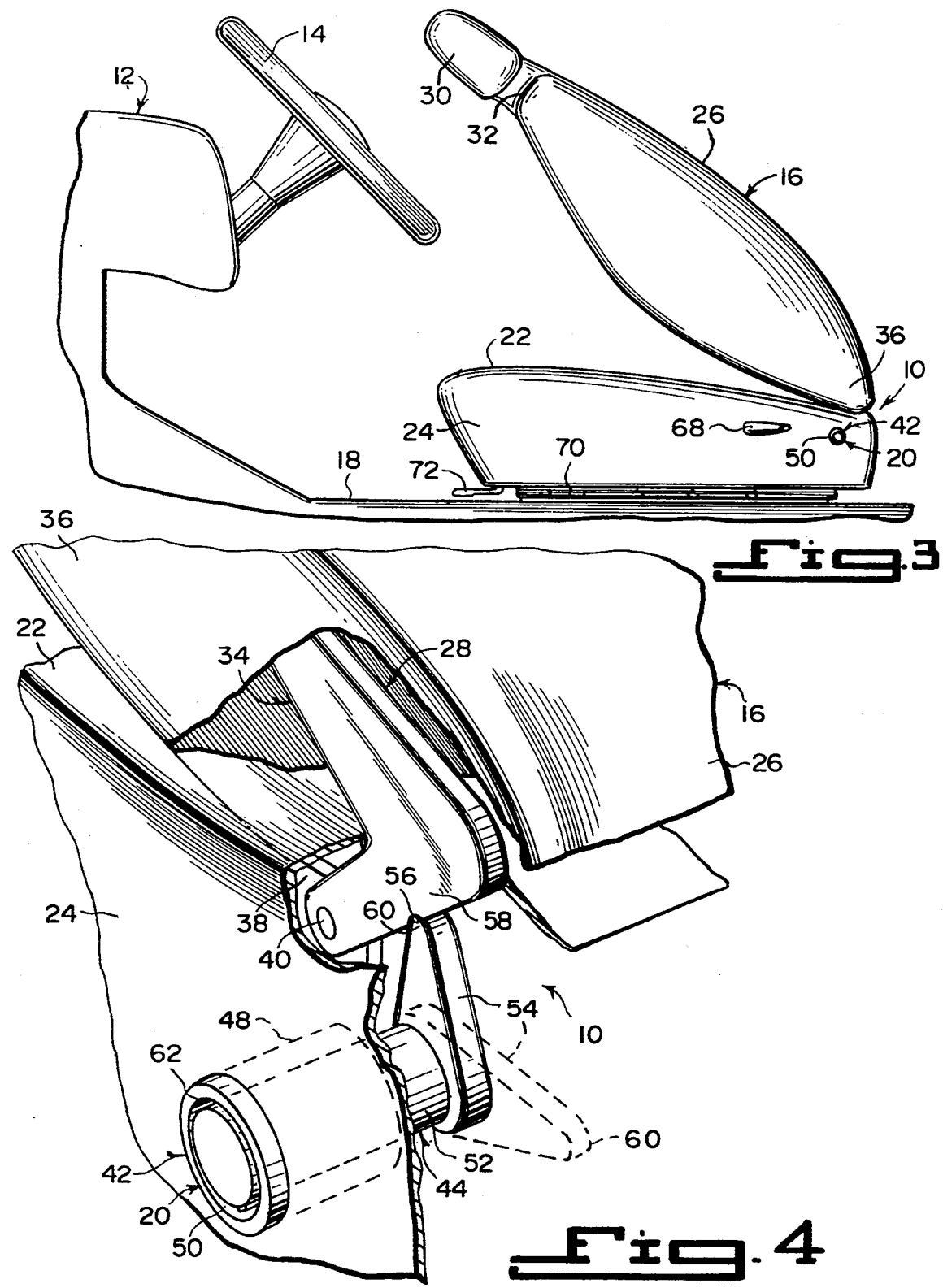

ANTI-THEFT DEVICE FOR A MOTOR VEHICLE

BACKGROUND OF THE INVENTION

1. Field of the Invention

The instant invention relates generally to car theft deterrent apparatuses and more specifically it relates to an anti-theft device for a motor vehicle.

2. Description of the Prior Art

Numerous car theft deterrent apparatuses have been provided in prior art that are adapted to clamp onto steering wheels, brakes, gearshifts and similar parts, to prevent thefts. These apparatuses are bulky and must be installed and removed when being used. While these units may be suitable for the particular purpose to which they address, they would not be as suitable for the purposes of the present invention as heretofore described.

SUMMARY OF THE INVENTION

A primary object of the present invention is to provide an anti-theft device for a motor vehicle that will overcome the shortcomings of the prior art devices.

Another object is to provide an anti-theft device for a motor vehicle, in which a locking mechanism built into a seat skirt in a driver bucket seat assembly will lock the backrest in a forward tilted position towards the steering wheel, so that a thief will not be able to sit and drive the motor vehicle.

An additional object is to provide an anti-theft device, in which the thief would have to destroy the locking mechanism in the seat assembly in order to sit behind the steering wheel, which would take an extremely long time to accomplish, thereby it would act as a time deterrent, since most thieves want to steel motor vehicles quickly.

A further object is to provide an anti-theft device for a motor vehicle that is simple and easy to use.

A still further object is to provide an anti-theft device for a motor vehicle that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view of a motor vehicle with parts broken away, showing the instant invention installed therein and in use.

FIG. 2 is an enlarged perspective view as indicated by arrow 2 in FIG. 1, showing a key ready to be installed into the locking mechanism.

FIG. 3 is a side elevational view taken in the direction of arrow 3 in FIG. 1.

FIG. 4 is a still further enlarged perspective view similar to FIG. 2 with parts broken away, showing the internal components of the locking mechanism.

DETAILED DESCRIPTION OF THE PREFERRED EMBODIMENTS

Turning now descriptively to the drawings, in which similar reference characters denote similar elements throughout the several views, FIGS. 1 through 4 illustrate an anti-theft device 10 for a motor vehicle 12 having a steering wheel 14, which consists of a driver bucket seat assembly 16 mounted on a floor 18 behind the steering wheel 14 in the motor vehicle 12. A mechanism 20 is for locking the driver bucket seat assembly 16 in a forward tilted position towards the steering wheel 14. A thief will not be able to sit in the driver bucket seat assembly 16 and drive the motor vehicle 14 away to steal it.

The driver bucket seat assembly 16 includes a seat cushion 22 having a skirt 24 thereabout. A backrest 26 is also provided. A structure 28, shown in FIG. 4, is for pivoting the backrest 26 on the seat cushion 22, so that the backrest 26 can go into the forward tilted position towards the steering wheel 14.

The driver bucket seat assembly 16 further contains an adjustable headrest 30 on a top edge 32 of the backrest 26, to provide additional cushioned comfort and protection to a head of a person sitting on the seat cushion 22.

The pivoting structure 28 consists of a pair of L-shaped legs 34, each secured within one side 36 of the backrest 26 adjacent the seat cushion 22. A pair of plates 38 are provided, with each secured within one side of the skirt 24 of the seat cushion 22 adjacent one L-shaped leg 34. A pair of pins 40 are also provided, with each extending through one L-shaped leg 34 and one plate 38, so that the backrest 26 can go into the forward tilted position towards the steering wheel 14.

The locking mechanism 20 contains a lock 42 built into the skirt 24 of the seat cushion 22 adjacent one L-shaped leg 34. Components 44 on an interior portion of the lock 42 are for engaging with the L-shaped leg 34 to retain the backrest 26 in the forward tilted position towards the steering wheel 14. A key 46, as shown in FIG. 2, is for insertion within the lock 42 to activate the engaging components 44, when the key 46 is turned in the lock 42.

The lock 42 includes a cylinder 48 having a keyway 50 to receive the key 46 when inserted. The engaging components 44 are a stub shaft 52 extending from a rear portion of the cylinder 48 and is turnable by the key 46 within the keyway 50 of the cylinder 48. A wing bit 54 is on a distal end of the stub shaft 42. The wing bit 54 can bear against the L-shaped leg 34, when the backrest 26 is in the forward tilted position towards the steering wheel 14 and the key 46 within the keyway 50 is turned in the proper direction. The L-shaped leg 34 has a notch 56 located on a side 58 that makes contact with a tip 60 of the wing bit 54, when the wing bit 54 on the stub shaft 52 is turned in the proper direction.

The lock 42 is a high security barrel-type lock. The keyway 50 in the cylinder 48 has a cylindrical recess 62 therein. The key 46 contains a bow 64 with a cylindrical blade 66, which fits within the cylindrical recess 62 of the keyway 50.

A tilt lever 68 is on the skirt 24 of the seat cushion 22, which when released will allow the backrest 26 to go into the forward tilted position towards the steering wheel 14. A seat rack 70 is for mounting in an adjustable manner, the seat cushion 22 with the skirt 24 of the driver bucket seat assembly 16 on the floor 18 behind the steering wheel 14 in the motor vehicle 12. A seat track lever 72 is provided, which when released will allow the seat cushion 22 with the skirt 24 of the driver bucket seat assembly 16 to slide forward and backward on the seat track 70.

OPERATION OF THE INVENTION

To use the anti-theft device 10, a person should take the following steps:
1. Release the seat track lever 72.
2. Slide the seat cushion 22 with the skirt 24 towards the steering wheel 14.
3. Release the tilt lever 68.
4. Place the backrest 26 in the forward tilted position towards the steering wheel 14.
5. Insert the cylindrical blade 66 of the key 46 into the cylindrical recess 62 in the keyway 50.
6. Turn the bow 64 of the key 46 in the proper direction, so that the tip 60 of the wing bit 54 will engage with the notch 56 in the side 58 of the L-shaped leg.
7. Remove the cylindrical blade 66 of the key 46 from the cylindrical recess 62 in the keyway 50, so that the backrest 26 will be retained in the forward tilted position towards the steering wheel 14, to prevent a thief from sitting in the driver bucket seat assembly 16 and drive the motor vehicle 12.

LIST OF REFERENCE NUMBERS

10 anti-theft device
12 motor vehicle
14 steering wheel in 12
16 driver bucket seat assembly
18 floor in 12
20 locking mechanism in 16
22 seat cushion of 16
24 skirt of 22
26 backrest of 16
28 pivoting structure for 26 on 22
30 adjustable headrest
32 top edge of 26
34 L-shaped leg
36 side of 26
38 plate
40 pin
42 lock
44 engaging components
46 key
48 cylinder in 42
50 keyway in 48
52 stub shaft
54 wing bit
56 notch in 58
58 side of 34
60 tip of 54
62 cylindrical recess in 50
64 bow on 46
66 cylindrical blade on 46
68 tilt lever
70 seat track
72 seat track lever It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An anti-theft device for a motor vehicle having a steering wheel which comprises:
   a) a driver bucket seat assembly mounted on a floor behind the steering wheel in the motor vehicle, said bucket seat assembly including a seat cushion having a skirt thereabout, a backrest, and means for pivoting said backrest on said seat cushion, so that said backrest can go into the forward tilted position towards the steering wheel;
   b) means for locking said driver bucket seat assembly in a forward tilted position towards the steering wheel, so that a thief will not be able to sit in said driver bucket seat assembly and drive the motor vehicle away to steal it;
   c) said pivoting means including a pair of L-shaped legs, each secured within one side of said backrest adjacent said seat cushion, a pair of plates, each secured within one side of said skirt of said seat cushion adjacent one said L-shaped leg, and a pair of pins, each extending through one said L-shaped leg and one said plate, so that said backrest can go into the forward tilted position towards the steering wheel;
   d) said locking means including a lock built into said skirt of said seat cushion adjacent one said L-shaped leg, means on an interior portion of said lock for engaging with said L-shaped leg to retain said backrest in the forward tilted position towards the steering wheel, said lock including a cylinder having a keyway to receive a key when inserted, said engaging means including a stub shaft extending from a rear portion of said cylinder and turnable by said key within said keyway of said cylinder, and a wing bit on a distal end of said stub shaft, said wing bit being rotatable between one position to bear against said L-shaped leg when said backrest is in the forward tilted position to prevent said backrest from being moved out of the tilted position and a second position unblocking said L-shaped leg, said engaging means being operated by said key within said keyway and turned in the proper direction to both block and unblock said L-shaped leg, said L-shaped leg having a notch located on a side to engage a tip of said wing bit when moved into a blocking position.

2. An anti-theft device for a motor vehicle as recited in claim 1, wherein said lock is a high security barrel-type lock.

3. An anti-theft device for a motor vehicle as recited in claim 2, wherein said keyway in said cylinder has a cylindrical recess therein.

4. An anti-theft device for a motor vehicle as recited in claim 3, wherein said key includes a bow with a cylindrical blade which fits within said cylindrical recess of said keyway.

* * * * *